US008292734B2

(12) United States Patent
Otomo et al.

(10) Patent No.: US 8,292,734 B2
(45) Date of Patent: Oct. 23, 2012

(54) GAME DEVICE, METHOD OF CONTROLLING A GAME DEVICE, AND INFORMATION STORAGE MEDIUM

(75) Inventors: Hitoshi Otomo, Chiba (JP); Seitaro Kimura, Kanagawa (JP); Hideyuki Shin, Tokyo (JP); Hidekazu Sekiguchi, Saitama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 248 days.

(21) Appl. No.: 12/749,182

(22) Filed: Mar. 29, 2010

(65) Prior Publication Data

US 2010/0248830 A1 Sep. 30, 2010

(30) Foreign Application Priority Data

Mar. 30, 2009 (JP) .................... 2009-083651

(51) Int. Cl.
*A63F 13/00* (2006.01)
(52) U.S. Cl. .......................... 463/31; 463/43
(58) Field of Classification Search ............ 463/31, 463/43
See application file for complete search history.

(56) References Cited

U.S. PATENT DOCUMENTS 6,699,127 B1 * 3/2004 Lobb et al. ............ 463/43
7,668,928 B2 * 2/2010 Newnam et al. ............ 709/216
7,717,789 B2 * 5/2010 Shimizu et al. ............ 463/30

FOREIGN PATENT DOCUMENTS

JP    2005046280 A  *  2/2005
JP    2007-229196 A     9/2007

OTHER PUBLICATIONS

Prince of Persia—Sands of Time, Ubisoft Entertainment, 2004, pp. 2-20.*

* cited by examiner

*Primary Examiner* — David L Lewis
*Assistant Examiner* — Shauna-Kay Hall
(74) *Attorney, Agent, or Firm* — Sughrue Mion, PLLC

(57) ABSTRACT

A game configured such that one or more game characters behave based on behavior control data is executed. A reexecution section reexecutes the game from a situation at a time point in the past. A generation section generates second behavior control data based on first behavior control data used at the time point in the past and an operation of a user. A save section causes the situation at the time point in the past and the second behavior control data to be stored as a reference situation and special behavior control data associated with the reference situation, respectively. In a case where a comparison result between the situation of the game and the reference situation is a predetermined result, behavior control section starts behavior control of the one or more game characters based on the special behavior control data associated with the reference situation.

7 Claims, 13 Drawing Sheets

| FORMATION | 4-3-3 |
|---|---|
| TACTICS | SIDE ATTACK |
| OFFENSIVE CONSCIOUSNESS | +3 |
| PRESSING | +2 |
| DEFENSIVE LINE | +3 |

FIG.8

| SITUATION DATA OF GAME SPACE (LOCATION STATE DATA) | LOCATION STATE DATA OF EACH PLAYER CHARACTER | ------ |
|---|---|---|
| | LOCATION STATE DATA OF BALL | ------ |
| SETTING STATE DATA OF VIRTUAL CAMERA | | ------ |
| SCORE DATA | | ------ |
| ELAPSED TIME DATA | | ------ |
| TACTICS DATA OF USER TEAM | | ------ |

FIG.9

| | GAME SITUATION DATA |
|---|---|
| 1 SECOND BEFORE | ------ |
| 2 SECONDS BEFORE | ------ |
| 3 SECONDS BEFORE | ------ |
| ... | ... |
| 29 SECONDS BEFORE | ------ |
| 30 SECONDS BEFORE | ------ |

FIG.10

| REFERENCE SITUATION DATA | SPECIAL TACTICS DATA |
|---|---|
| ------ | ------ |
| ------ | ------ |

FIG.15

| POSITION | PLAYER NAME | △ |
|---|---|---|
| FW | — — — — — — | |
| FW | — — — — — — | |
| FW | — — — — — — | |
| MF | — — — — — — | |
| MF | — — — — — — | ▽ |

◯ ENTER

FIG.16

| FORMATION | | 4-3-3 |
|---|---|---|
| TACTICS | | SIDE ATTACK |
| OFFENSIVE CONSCIOUSNESS | | +3 |
| PRESSING | | +2 |
| DEFENSIVE LINE | | +3 |
| RECORDING RESULT DATA | PLAYER IDENTIFICATION DATA | — — — — — |
| | OPERATION DATA OR BEHAVIOR DATA | — — — — — |

GAME DEVICE, METHOD OF CONTROLLING A GAME DEVICE, AND INFORMATION STORAGE MEDIUM

CROSS-REFERENCE TO RELATED APPLICATION

The present application claims priority from Japanese application JP 2009-083651 filed on Mar. 30, 2009, the content of which is hereby incorporated by reference into this application.

BACKGROUND OF THE INVENTION

1. Field of the Invention

The present invention relates to a game device, a method of controlling a game device, and an information storage medium.

2. Description of the Related Art

A game configured such that one or more game characters behave based on behavior control data is known. For example, a soccer game in which a player character set as an operation subject of a user behaves according to an operation of the user, and teammate player characters behave based on the behavior control data (for example, parameter indicating whether or not to attack aggressively) that is set by the user in advance is known (for example, JP 2007-229196 A).

SUMMARY OF THE INVENTION

In such a game as described above, the user needs to adjust the behavior control data according to the situation of the game. For this reason, it is strongly desired that a function of assisting the adjustment of the behavior control data be realized in such a game.

The present invention has been made in view of the above-mentioned circumstances, and has an object to provide a game device, a method of controlling a game device, and an information storage medium, which are capable of realizing a function of assisting adjustment of behavior control data in a game configured such that one or more game characters behave based on the behavior control data.

In order to achieve the above-mentioned object, a game device according to the present invention is a game device for executing a game configured such that one or more game characters behave based on behavior control data. The game device includes: a reexecution section for returning a situation of the game to a situation at a time point in the past, and reexecuting the game from the situation at the time point in the past; a generation section for generating second behavior control data based on first behavior control data and an operation of a user, the first behavior control data being the behavior control data used at the time point in the past; a save section for storing the situation at the time point in the past as a reference situation in a storage, and storing, in the storage, the second behavior control data as special behavior control data associated with the reference situation; a comparison result acquiring section for acquiring, in the game to be executed after the reference situation and the special behavior control data are stored in the storage, a comparison result between the situation of the game and the reference situation; and a behavior control section for starting, in a case where the comparison result is a predetermined result, behavior control of the one or more game characters based on the special behavior control data stored in association with the reference situation.

Further, a method of controlling a game device according to the present invention is a method of controlling a game device for executing a game configured such that one or more game characters behave based on behavior control data. The method includes: a reexecution step of returning a situation of the game to a situation at a time point in the past, and reexecuting the game from the situation at the time point in the past; a generation step of generating second behavior control data based on first behavior control data and an operation of a user, the first behavior control data being the behavior control data used at the time point in the past; a save step of storing the situation at the time point in the past as a reference situation in a storage, and storing, in the storage, the second behavior control data as special behavior control data associated with the reference situation; a comparison result acquiring step of acquiring, in the game to be executed after the reference situation and the special behavior control data are stored in the storage, a comparison result between the situation of the game and the reference situation; and a behavior control step of starting, in a case where the comparison result is a predetermined result, behavior control of the one or more game characters based on the special behavior control data stored in association with the reference situation.

Further, a program according to the present invention is a program for causing a computer, such as a consumer game machine (stationary game machine), a portable game machine, an arcade game machine, a mobile phone, a personal digital assistant (PDA), or a personal computer, to function as a game device for executing a game configured such that one or more game characters behave based on behavior control data. The program further causes the computer to function as: a reexecution section for returning a situation of the game to a situation at a time point in the past, and reexecuting the game from the situation at the time point in the past; a generation section for generating second behavior control data based on first behavior control data and an operation of a user, the first behavior control data being the behavior control data used at the time point in the past; a save section for storing the situation at the time point in the past as a reference situation in a storage, and storing, in the storage, the second behavior control data as special behavior control data associated with the reference situation; a comparison result acquiring section for acquiring, in the game to be executed after the reference situation and the special behavior control data are stored in the storage, a comparison result between the situation of the game and the reference situation; and a behavior control section for starting, in a case where the comparison result between the situation of the game and the reference situation is a predetermined result, behavior control of the one or more game characters based on the special behavior control data stored in association with the reference situation.

Further, an information storage medium according to the present invention is a computer-readable information storage medium storing the above-mentioned program.

According to the present invention, it is possible to realize the function of assisting the adjustment of the behavior control data in the game configured such that one or more game characters behave based on the behavior control data.

Further, according to one aspect of the present invention, the generation section may include a section for displaying, on a display unit, a screen for prompting the user to change the first behavior control data, and the generation section may generate the second behavior control data by changing the first behavior control data based on the operation performed by the user on the screen.

Further, in the one aspect of the present invention, the generation section may acquire, as the second behavior control data, the behavior control data obtained by changing the first behavior control data based on the operation performed by the user on the screen. The reexecution section may include a section for causing the one or more game characters to behave based on the second behavior control data in the reexecuted game.

Further, according to another aspect of the present invention, the game may be a game configured such that a plurality of game characters behave based on the behavior control data. The generation section may include a section for acquiring third behavior control data obtained by changing the first behavior control data based on the operation performed by the user on the screen. The reexecution section may include: a section for setting one of the plurality of game characters as an operation subject of the user in the reexecuted game; a section for causing the one of the plurality of game characters, which is set as the operation subject of the user, to behave according to an operation of the user in the reexecuted game; and a section for causing one or more game characters that are not set as the operation subject of the user among the plurality of game characters to behave based on the third behavior control data in the reexecuted game. The generation section may generate the second behavior control data based on the third behavior control data and at least one of a content of the operation that the user has performed with respect to the one of the plurality of game characters, which is set as the operation subject of the user, and a content of a behavior that the one of the plurality of game characters, which is set as the operation subject of the user, has performed according to the operation of the user.

Further, according to a further aspect of the present invention, the game may be a game configured such that a plurality of game characters behave based on the behavior control data. The reexecution section may include: a section for setting one of the plurality of game characters as an operation subject of the user in the reexecuted game; and a section for causing the one of the plurality of game characters, which is set as the operation subject of the user, to behave according to an operation of the user in the reexecuted game. The generation section may generate the second behavior control data based on the first behavior control data and at least one of a content of the operation that the user has performed with respect to the one of the plurality of game characters, which is set as the operation subject of the user, and a content of a behavior that the one of the plurality of game characters, which is set as the operation subject of the user, has performed according to the operation of the user.

BRIEF DESCRIPTION OF THE DRAWINGS

In the accompanying drawings:

FIG. 8 is a schematic diagram illustrating an example of game situation data;

FIG. 9 is a schematic diagram illustrating an example of storage contents of a past situation data storage section;

FIG. 10 is a schematic diagram illustrating an example of storage contents of a special behavior control data storage section;

FIG. 15 is a diagram illustrating an example of a player selection screen;

FIG. 16 is a schematic diagram illustrating another example of the tactics data;

DETAILED DESCRIPTION OF THE INVENTION

Hereinafter, detailed description is given of examples of embodiments of the present invention with reference to the drawings. A game device according to each of the embodiments of the present invention is implemented by, for example, a consumer game machine (stationary game machine), a portable game machine, a personal computer, a mobile phone, or a personal digital assistant (PDA). In this specification, description is given of a case in which the game device according to the embodiment is implemented by a consumer game machine.

First Embodiment

Figure 1:
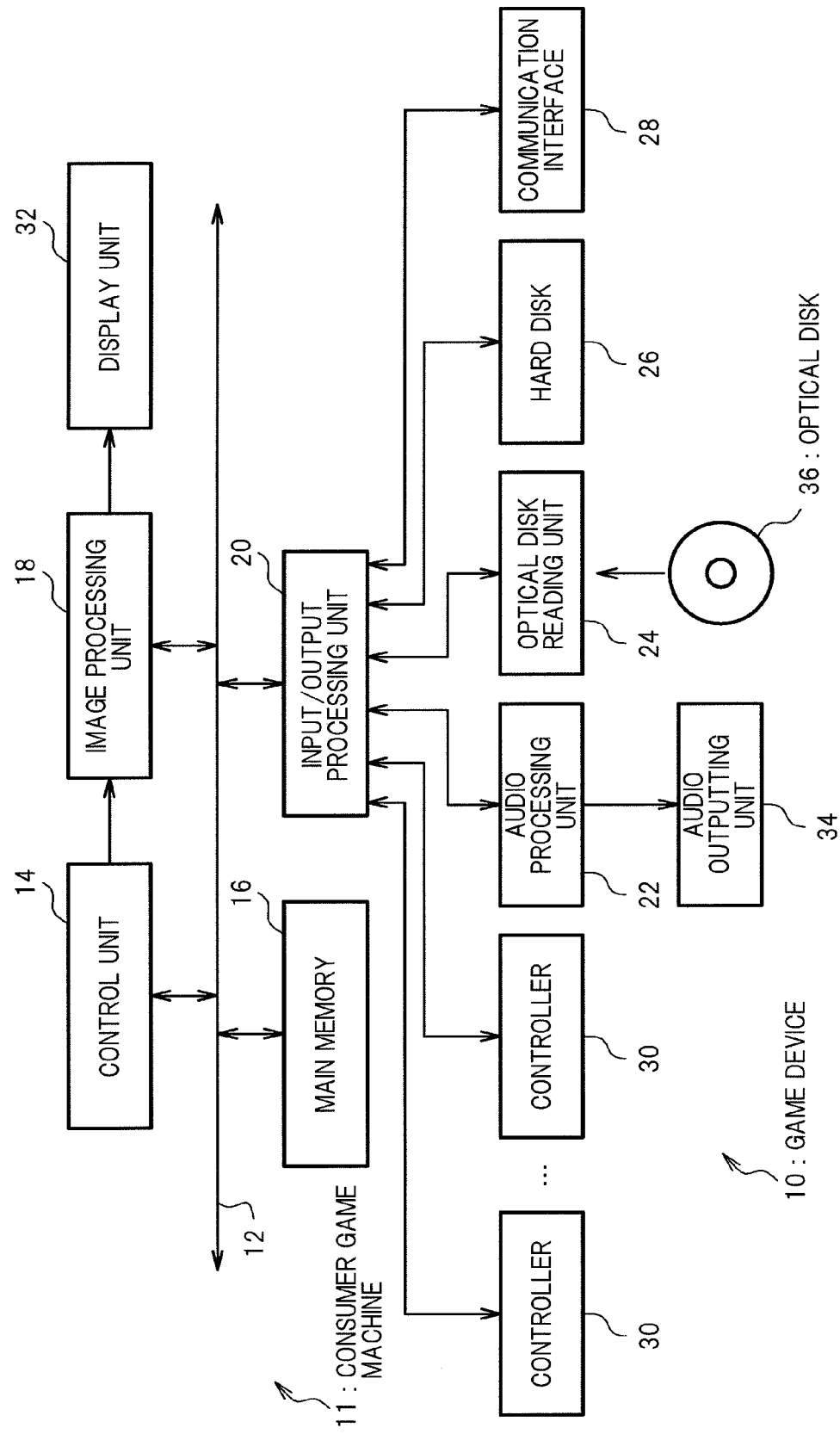
FIG. 1 is a diagram illustrating a hardware configuration of a game device according to embodiments of the present invention.

FIG. 1 is a diagram illustrating a hardware configuration of a game device 10 according to a first embodiment of the present invention. As illustrated in FIG. 1, the game device 10 includes a consumer game machine 11, a display unit 32, an audio outputting unit 34, and an optical disk 36 (information storage medium). The display unit 32 is a display device such as a television set or a liquid crystal display, for example. The audio outputting unit 34 is an audio outputting device such as a speaker or headphones, for example.

The consumer game machine 11 is a computer game system. The consumer game machine 11 includes a bus 12, a control unit 14, a main memory 16, an image processing unit 18, an input/output processing unit 20, an audio processing unit 22, an optical disk reading unit 24, a hard disk 26, a communication interface 28, and a controller 30.

The control unit 14 includes one or a plurality of microprocessors. The control unit 14 executes various types of information processing based on an operating system stored in a ROM (not shown), or a program read from the optical disk 36. The main memory 16 includes, for example, a RAM. The program and data read from the optical disk 36 are written into the main memory 16 as necessary. The main memory 16 is also used as a working memory for the control unit 14.

The bus 12 is used for exchanging addresses and data among the components of the consumer game machine 11.

The image processing unit 18 includes a VRAM, and renders, based on image data supplied from the control unit 14, a game screen in the VRAM. Then, the game screen rendered in the VRAM is converted into video signals, and is output to the display unit 32.

The input/output processing unit 20 is an interface for the control unit 14 to access the audio processing unit 22, the optical disk reading unit 24, the hard disk 26, the communication interface 28, and the controller 30. The audio processing unit 22 includes a sound buffer, and outputs, from the audio outputting unit 34, various types of audio data (for example, game music, game sound effects, dialogue, etc.) that have been read from the optical disk 36 into the sound buffer. The communication interface 28 is an interface for connecting the consumer game machine 11 to a communication network by wire or wireless.

The optical disk reading unit 24 reads a program or data recorded on the optical disk 36. In this specification, the optical disk 36 is used for supplying the program or the data to the consumer game machine 11. Alternatively, another information storage medium, such as a memory card, may be used. Alternatively, the program or the data may be supplied to the consumer game machine 11 from a remote place via a communication network such as the Internet, for example. The hard disk 26 is a commonly-used hard disk device (auxiliary storage device). It should be noted that the program or the data, which is assumed to be stored in the optical disk 36 in the following description, may be stored in the hard disk 26.

The controller 30 is operation means for a user to perform various types of game operations. A plurality of the controllers 30 may be connected to the consumer game machine 11 by wire or wireless. The input/output processing unit 20 scans an operation state of the controller 30 at fixed intervals (for example, every $1/60^{th}$ of a second), and then transfers an operation signal indicating a result of the scanning to the control unit 14 via the bus 12. The control unit 14 makes judgment on the user's game operation based on the operation signal.

On the game device 10, for example, a soccer game simulating a soccer match is executed between a team operated by the user (hereinafter, referred to as "user team") and a team operated by an opponent (hereinafter, referred to as "opponent team"). The soccer game is implemented by executing a game program read from the optical disk 36.

Figure 2:
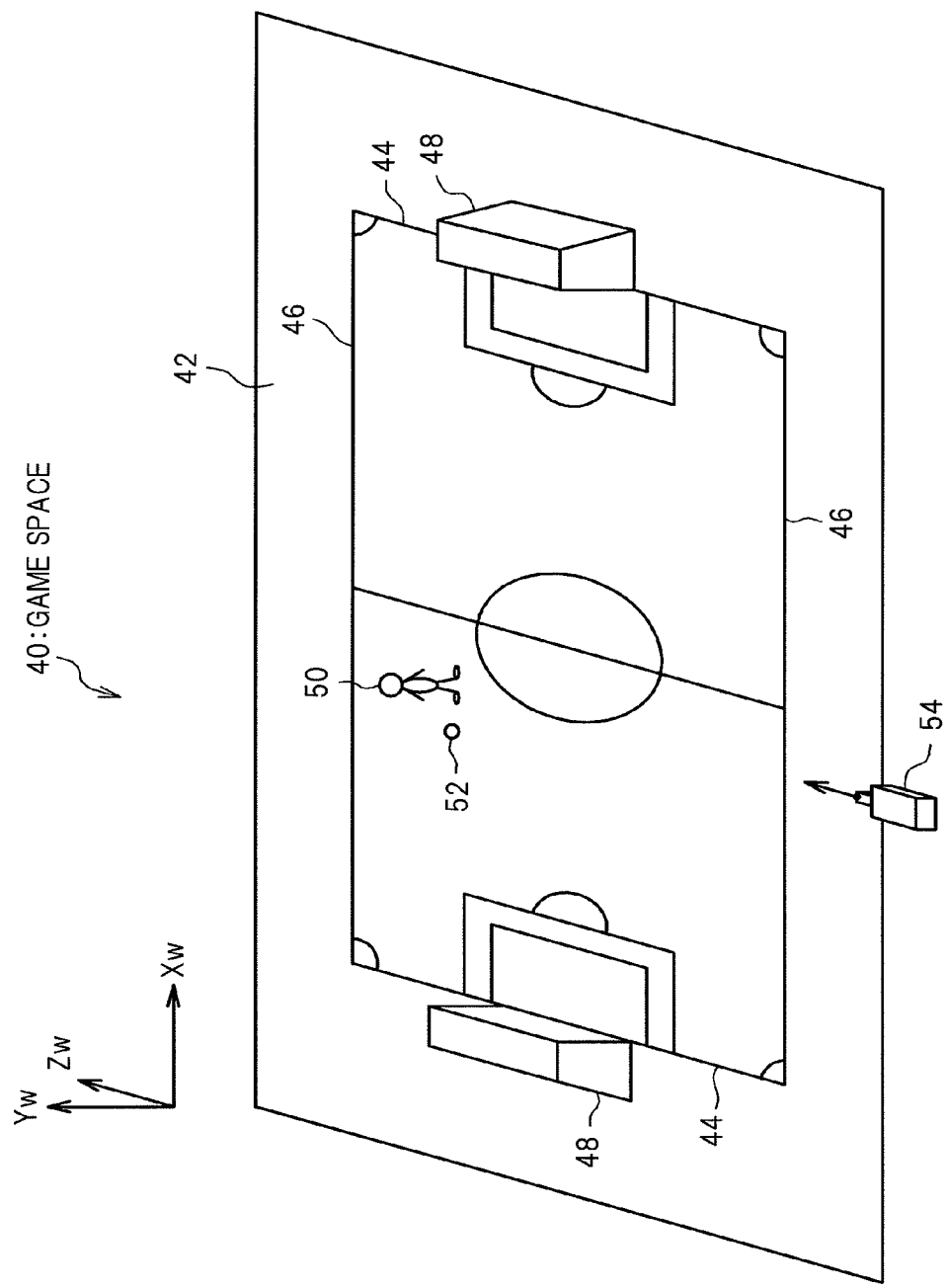
FIG. 2 is a diagram illustrating an example of a game space.

In order to implement the soccer game, a game space is built in the main memory 16. FIG. 2 illustrates an example of the game space. A game space 40 illustrated in FIG. 2 is a virtual three-dimensional space. As illustrated in FIG. 2, a field 42, which is an object representing a soccer field, is located in the game space 40. For example, goal lines 44 and touchlines 46 are drawn on the field 42.

Further, goals 48, which are objects representing soccer goals, a player character 50, which is an object representing a soccer player, and a ball 52, which is an object representing a soccer ball are located on the field 42. Eleven player characters 50 belonging to the user team, and eleven player characters 50 belonging to the opponent team are located on the field 42, but illustration thereof is omitted in FIG. 2. It should be noted that the player character 50 and the ball 52 are dynamic objects whose positions, postures, etc. change within the game space 40.

One of the goals 48 is associated with the user team, whereas the other one of the goals 48 is associated with the opponent team. If the ball 52 moves into the goal 48 associated with any one of the teams, a scoring event occurs for the other one of the teams.

If a player character 50 and the ball 52 come close to each other, the player character 50 and the ball 52 become associated with each other under a predetermined condition. In this case, the moving action of the player character 50 becomes a dribbling action. The state in which the ball 52 is associated with the player character 50 is hereinafter referred to as a state in which "the player character 50 is in possession of the ball 52".

Figures 3, 4:
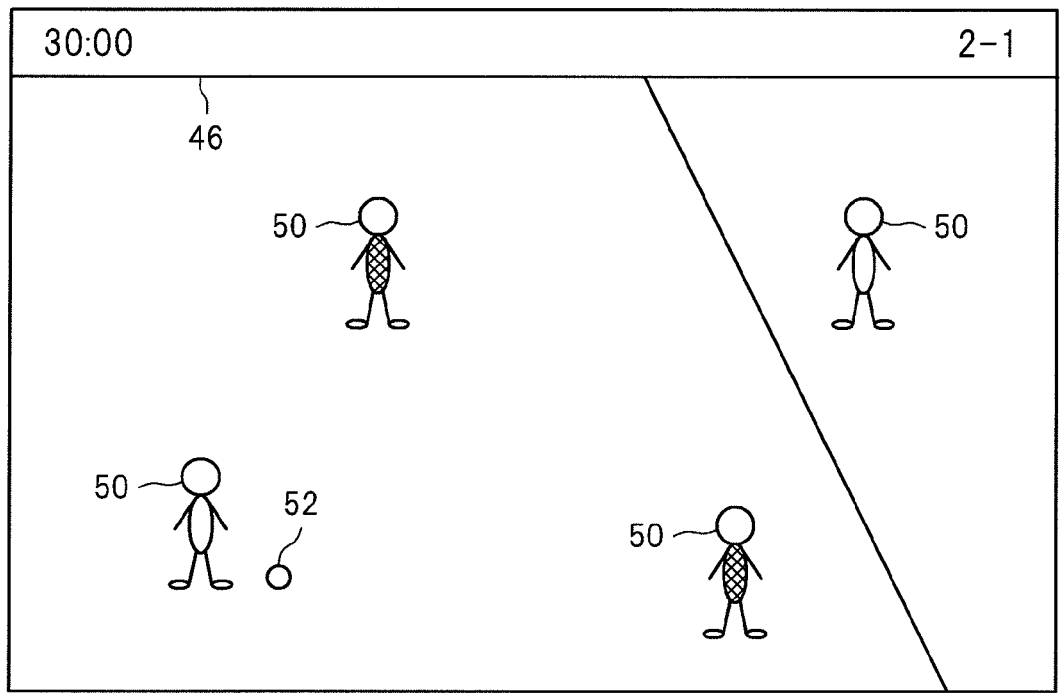
FIG. 3 is a diagram illustrating an example of a game screen during a match.
FIG. 4 is a schematic diagram illustrating an example of tactics data.

In addition, a virtual camera 54 (viewpoint) is set in the game space 40. An image showing a situation of the game space 40, which is viewed from the virtual camera 54, is displayed in the game screen displayed on the display unit 32 during a match. FIG. 3 is an example of the game screen during a match. For example, in order to constantly display the ball 52 on the game screen, the virtual camera 54 moves around within the game space 40 according to the position of the ball 52.

Any one of a plurality of player characters 50 belonging to the user team is set as an operation subject of the user. The operation subject of the user is switched among the player characters 50 belonging to the user team based on, for example, the position of the ball 52 or the operation of the user. The player character 50 set as the operation subject of the user behaves according to the operation of the user. On the other hand, player characters 50 that belong to the user team and are not set as the operation subject of the user (hereinafter, referred to as "teammate player characters") behave based on tactics data of the user team.

Here, description is given of the tactics data of the user team. As described above, the tactics data is data used as a basis for behavior control of the teammate player characters (behavior control data). The tactics data of the user team is set by the user, for example, before the match starts. FIG. 4 is a schematic diagram illustrating an example of the tactics data of the user team. The tactics data illustrated in FIG. 4 contains such data as follows:

(a) formation;
(b) tactics;
(c) "offensive consciousness" parameter;
(d) "pressing" parameter; and
(e) "defensive line" parameter.

The "formation" indicates a formation of the user team, which is selected by the user from among a plurality of formations prepared in advance. It should be noted that, in FIG. 4 a formation "4-3-3" is a formation in which four defenders (DFs), three midfielders (MFs), three forwards (FWs), and a goalkeeper (GK) are located.

Further, "tactics" are the tactics of the user team, which are selected by the user from among a plurality of tactics prepared in advance. Examples of the tactics available for the user to select from include a "side attack", a "center attack", and a "counter attack". The "side attack" is a tactic of making an attack by mainly using an area in the vicinity of the touchline 46. The "center attack" is a tactic of making an attack by mainly using a central area. The "counter attack" is a tactic of making a swift attack by, even if the opponent team is attacking, positioning a forward player character 50 within the opponent's area and feeding a pass to the forward player character 50 as soon as the ball 52 is taken from the opponent team.

Further, the "offensive consciousness" parameter is a parameter indicating how aggressively the attack is to be made. For example, the "offensive consciousness" parameter takes values ranging from −5 to +5. As the value of the "offensive consciousness" parameter becomes higher, the attack is made more aggressively. On the other hand, as the value of the "offensive consciousness" parameter becomes lower, the user team plays more defensively.

Further, the "pressing" parameter is a parameter indicating how aggressively the so-called press defense is to be carried out. The "press defense" is a defensive action of rushing towards and pressing a player character 50 that is in possession of the ball 52. For example, the "pressing" parameter also takes values ranging from −5 to +5. As the value of the "pressing" parameter becomes higher, the player characters 50 belonging to the user team carry out the press defense more aggressively.

Further, the "defensive line" parameter is a parameter indicating how much the so-called defensive line is to be moved up. The "defensive line" is a virtual line drawn in parallel with the goal line 44 at the position of a defender that is the closest to the goal 48, which the user team is defending, among the defenders belonging to the user team. Further, "moving up the defensive line" means that the defender player characters 50 belonging to the user team are made to be positioned away from the goal 48 that the user team is defending. For example, the "defensive line" parameter also takes values ranging from −5 to +5. As the "defensive line" parameter becomes higher, the defensive line is moved up further.

It should be noted that the "offensive consciousness" parameter and the "pressing" parameter may be set for each of the player characters 50 belonging to the user team.

The game device 10 according to this embodiment has two game modes, which are a normal mode and a practice mode. The normal mode is a mode for the user to enjoy competing against another user or the computer. In the normal mode, a match is executed between the user team and the opponent team operated by another user or the computer.

On the other hand, the practice mode is a mode for the user to practice with the game. In the practice mode, a match is executed between the user team and the opponent team operated by the computer. The practice mode is different from the normal mode in that the practice mode has a retry function. Hereinafter, description is given of the retry function.

In the practice mode, during a match, data indicating a situation of the match is recorded at predetermined time intervals (for example, one second). As a result, during the match, the user can return the situation of the match to a situation at a time point in the past (a previous situation), and can play the game again from that situation. For example, in a case where a scoring event for the opponent team has occurred, the user can return the situation of the match to the situation at a time point that is a short time before the time point of occurrence of the scoring event for the opponent team, and can play the game again from that situation.

Figure 5:
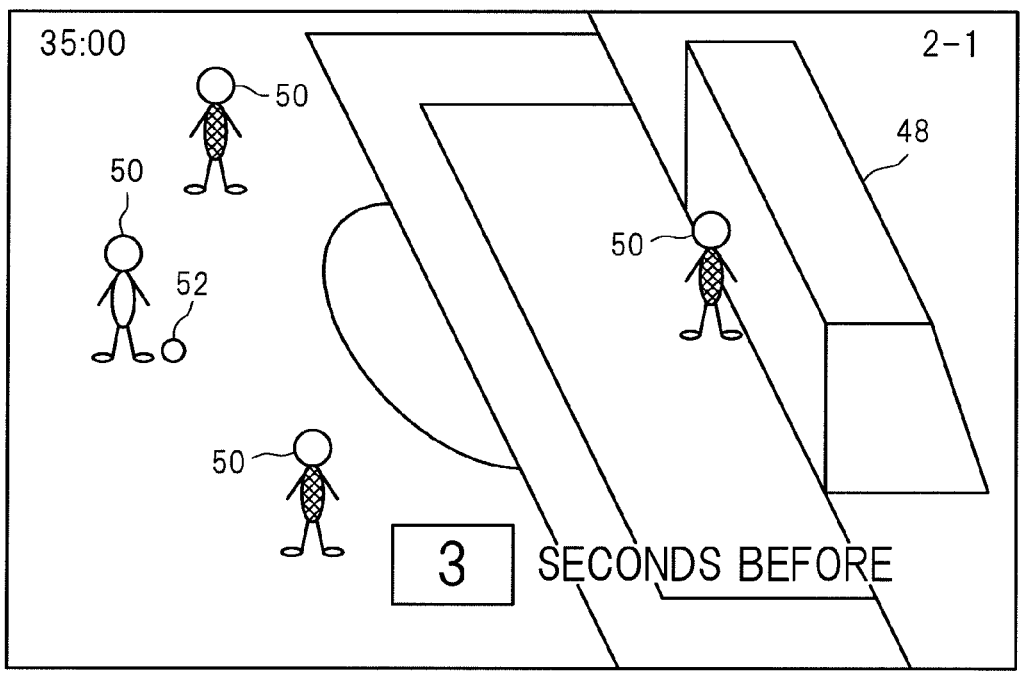
FIG. 5 is a diagram illustrating an example of a time point specifying screen.

In a case where the user returns the situation of the match to a situation at a time point in the past, the user performs a suspend operation for temporarily suspending the ongoing match. In a case where the suspend operation has been performed, the ongoing match is temporarily suspended. At the same time, a time point specifying screen, on which the user specifies which time point the situation of the game is to be returned to, is displayed. FIG. 5 illustrates an example of the time point specifying screen. On this time point specifying screen, the user specifies how many seconds before the situation of the match is to be returned to. It should be noted that, hereinafter, the time point specified by the user on the time point specifying screen is referred to as a "time point X".

Figure 6:
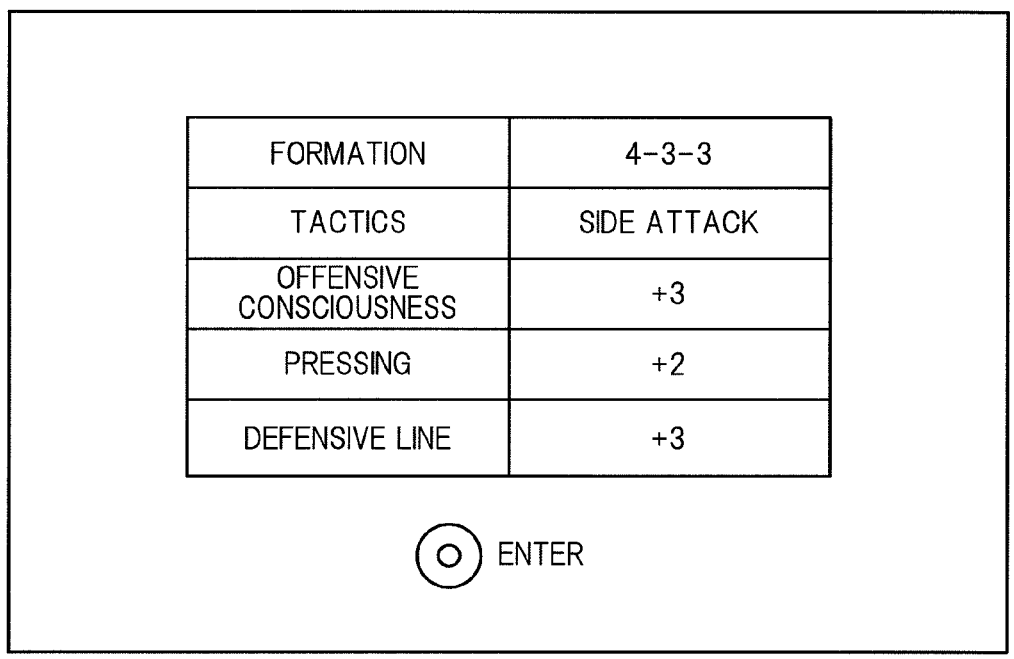
FIG. 6 is a diagram illustrating an example of a tactics setting screen.

After the user finishes specifying the time point X on the time point specifying screen, a tactics setting screen for changing the tactics data of the user team is subsequently displayed. FIG. 6 illustrates an example of the tactics setting screen. On the tactics setting screen, the user changes the tactics data by operating the controller 30.

After the user finishes changing the tactics data on the tactics setting screen, the situation of the match at the time point X is reproduced, and the game is resumed from that situation. In this case, the teammate player characters behave based on the changed tactics data.

By utilizing the retry function described above, the user can repeatedly practice playing the game from a situation at a time point in the past. For example, in a case where a scoring event for the opponent team has occurred, the user can repeatedly practice playing the game from a time point that is a short time before the time point of occurrence of the scoring event for the opponent team.

Further, on the occasion of playing the game again from the situation at the time point in the past, the user can change the tactics data of the user team. Owing to this, the user can put to the test whether or not the situation of the match improves by changing the tactics data of the user team. Thus, the user can optimally adjust the tactics data according to the situation.

Further, the game device 10 has a function of providing assistance so that the result of adjusting the tactics data in the practice mode may be utilized during a game in the normal mode to be executed thereafter.

Specifically, in the game device 10, the combination of the situation of the match at the time point (time point X) specified by the user on the time point specifying screen (see FIG. 5) and the tactics data changed on the tactics setting screen (see FIG. 6) is saved as the combination of a reference situation and special tactics data. Specifically, the combination of the situation that the user has practiced in the practice mode and the tactics data adjusted according to that situation is saved.

Then, in the normal mode to be executed thereafter, it is monitored whether or not the situation of the match has become a situation identical or similar to the reference situation. If the situation of the match has become a situation identical or similar to the reference situation, the behaviors of the teammate player characters are controlled based on the special tactics data associated with the reference situation.

As described above, with the game device 10, the user can adjust the tactics data according to a situation at a time point in the past in the practice mode. Further, the result of the adjustment can be utilized during the game in the normal mode, which is executed thereafter.

Figure 7:
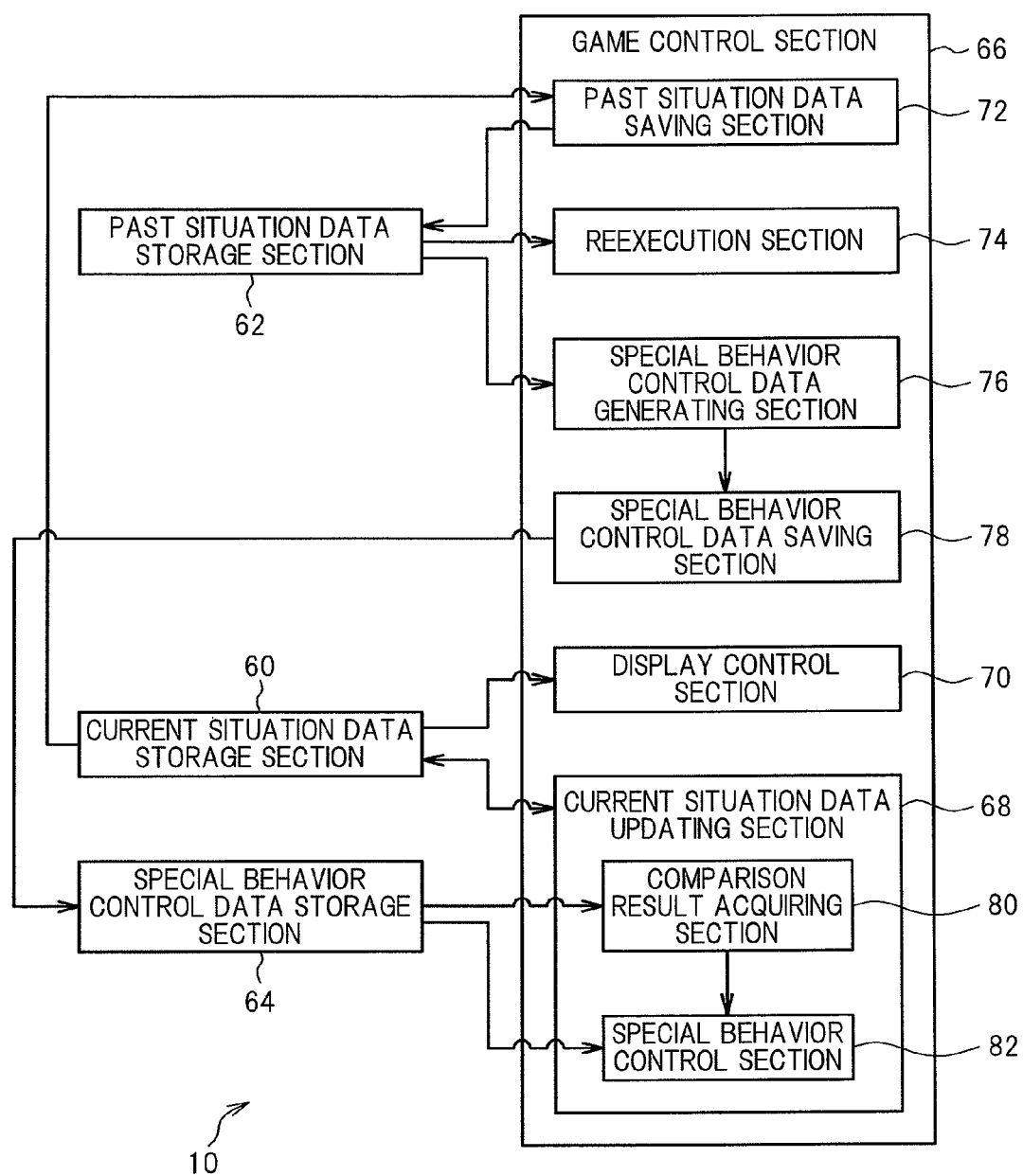
FIG. 7 is a functional block diagram illustrating an example of functional blocks implemented in the game device.

Hereinafter, description is given of a configuration for implementing such functions as described above. FIG. 7 is a functional block diagram illustrating an example of functional blocks implemented in the game device 10. The functional block diagram illustrated in FIG. 7 mainly illustrates functional blocks relevant to the functions described above. As illustrated in FIG. 7, the game device 10 includes a current situation data storage section 60, a past situation data storage section 62, a special behavior control data storage section 64, and a game control section 66.

The current situation data storage section 60 and the past situation data storage section 62 are mainly implemented by, for example, the main memory 16, whereas the special behavior control data storage section 64 is mainly implemented by, for example, the hard disk 26. The game control section 66 is a functional block for executing game control in the normal mode and the practice mode, and is mainly implemented by, for example, the control unit 14.

Further, as illustrated in FIG. 7, the game control section 66 includes a current situation data updating section 68, a display control section 70, a past situation data saving section 72, a reexecution section 74, a special behavior control data generating section 76, and a special behavior control data saving section 78. Further, the current situation data updating section 68 includes a comparison result acquiring section 80 and a special behavior control section 82.

The current situation data storage section 60, the current situation data updating section 68, and the display control section 70 are functional blocks common to both the normal mode and the practice mode.

The current situation data storage section 60 stores data indicating the current situation of the game. FIG. 8 is a schematic diagram illustrating an example of the data indicating the situation of the game (hereinafter, referred to as "game situation data"). The game situation data illustrated in FIG. 8 contains such data as follows:

(A) situation data of the game space 40;
(B) setting state data of the virtual camera 54;
(C) score data;
(D) elapsed time data; and
(E) tactics data of the user team.

The situation data of the game space 40 is data related to the location states of dynamic objects located in the game space 40. In this embodiment, the player characters 50 and the ball 52 correspond to the dynamic objects, and hence the situation data of the game space 40 contains such data as follows:

(A-1) location state data of each player character 50; and
(A-2) location state data of the ball 52.

The location state data of each player character 50 is data indicating the location state (for example, position, orientation, posture, moving direction, etc.) of each player character 50. The location state data of each player character 50 also contains data indicating whether or not the player character 50 is in possession of the ball 52 and data indicating whether or not the player character 50 is set as the operation subject of the user. Further, the location state data of the ball 52 is data indicating the location state (for example, position, moving direction, etc.) of the ball 52. It should be noted that, hereinafter, the situation data of the game space 40 is referred to as "location state data".

The setting state data of the virtual camera 54 is data indicating the setting state (for example, position, direction of sight, etc.) of the virtual camera 54. The score data is data indicating the scores of both the teams. The elapsed time data is data indicating the elapsed time.

The current situation data updating section 68 updates the current situation of the game by updating the game situation data stored in the current situation data storage section 60.

For example, the current situation data updating section 68 updates the location state (for example, position, orientation, etc.) of the player character 50 set as the operation subject of the user, based on the operation of the user. With this configuration, the player character 50 set as the operation subject of the user behaves based on the operation of the user.

Further, for example, the current situation data updating section 68 updates the location states (for example, positions, orientations, etc.) of the teammate player characters based on a behavior decision algorithm and the tactics data of the user team. It should be noted that the behavior decision algorithm is an algorithm for making a decision on the behaviors that the teammate player characters are to take based on the tactics data of the user team. With this configuration, the teammate player characters behave based on the tactics data.

Further, for example, the current situation data updating section 68 also updates the location state (for example, position, moving direction, etc.) of the ball 52. Detailed description of operation of the current situation data updating section 68 is given later (see S104 of FIG. 11 and S207 of FIG. 14).

The display control section 70 displays, on the display unit 32, a game screen (see FIG. 3) showing a situation of the whole of or a part of the game space 40. Detailed description of operation of the display control section 70 is given later (see S105 of FIG. 11 and S208 of FIG. 14).

The past situation data storage section 62, the past situation data saving section 72, and the reexecution section 74 are functional blocks relevant to the practice mode (retry function). Further, the special behavior control data storage section 64, the special behavior control data generating section 76, the special behavior control data saving section 78, the comparison result acquiring section 80, and the special behavior control section 82 are functional blocks relevant to the adjustment of the tactics data.

The past situation data storage section 62 stores data indicating the situation of the game at a time point in the past. In this embodiment, the past situation data storage section 62 stores the game situation data (see FIG. 8) for each of a plurality of time points of past. FIG. 9 is a schematic diagram illustrating an example of storage contents of the past situation data storage section 62. In the example illustrated in FIG. 9, the game situation data is stored at predetermined time intervals (for example, one second) during a period ranging from a predetermined period of time (for example, thirty seconds) before to the current time point.

At predetermined time intervals (for example, one second), the past situation data saving section 72 causes the past situation data storage section 62 to store the game situation data at the time point. In this embodiment, at predetermined time intervals (for example, one second), the past situation data saving section 72 copies the game situation data stored in the current situation data storage section 60 to the past situation data storage section 62.

The reexecution section 74 reproduces the situation of the game at a time point in the past based on the storage contents of the past situation data storage section 62, and reexecutes the game from that situation. In this embodiment, the reexecution section 74 returns the situation of the game to the situation at the time point in the past (time point X) specified by the user, and reexecutes the game from that situation. Detailed description of operation of the reexecution section 74 is given later (see S109 and S110 of FIG. 12).

Based on first tactics data (first behavior control data), which is the tactics data (behavior control data) used at the time point X, and on the operation of the user, the special behavior control data generating section 76 generates second tactics data (second behavior control data). As described later, the second tactics data is stored in the special behavior control data storage section 64 as the special tactics data (special behavior control data).

For example, the special behavior control data generating section 76 displays the tactics setting screen (see FIG. 6) on the display unit 32. The tactics setting screen is a screen for prompting the user to change the first tactics data. The special behavior control data generating section 76 generates the second tactics data by changing the first tactics data based on the operation performed by the user on the tactics setting screen.

In this embodiment, the special behavior control data generating section 76 acquires, as the second tactics data, tactics data obtained by changing the first tactics data based on the operation performed by the user on the tactics setting screen. Detailed description of operation of the special behavior control data generating section 76 is given later (see S111 to S114 of FIG. 12).

The special behavior control data saving section 78 causes the special behavior control data storage section 64 to store, as the reference situation, the situation of the game at the time point X, and also causes the special behavior control data storage section 64 to store, as the special tactics data corresponding to the reference situation, the second tactics data generated by the special behavior control data generating section 76.

FIG. 10 is a schematic diagram illustrating an example of the storage contents of the special behavior control data storage section 64. As illustrated in FIG. 10, in the special behavior control data storage section 64, reference situation data indicating the reference situation and the special tactics data are stored in association with each other. As the reference situation data, for example, the game situation data (see FIG. 8) at the time point X is stored.

It should be noted that, as described below, the reference situation data is referred to by the comparison result acquiring section 80 in order to judge whether or not the current situation of the game is identical or similar to the reference situation. Thus, only information necessary for the above-mentioned judgment may be stored as the reference situation data.

For example, in a case where the location states of the player characters 50 and the ball 52, which are the dynamic objects, are used to carry out the judgment, only the location state data, which is a part of the game situation data (see FIG. 8), may be stored as the reference situation data.

Further, for example, in a case where only the positions of the player characters 50 and the ball 52, which are the dynamic objects, are used to carry out the judgment, only the position data of the player characters 50 and the ball 52 may be stored as the reference situation data.

The comparison result acquiring section 80 acquires the result of comparison between the current situation of the game and the reference situation. For example, the comparison result acquiring section 80 compares the current situation of the game with the reference situation, and then acquires the result of the comparison. In this embodiment, the comparison result acquiring section 80 acquires a degree of similarity between the current situation of the game and the reference situation. Detailed description of operation of the comparison result acquiring section 80 is given later (see S201 of FIG. 13).

In a case where the comparison result acquired by the comparison result acquiring section 80 is a predetermined result, the special behavior control section 82 starts behavior control of the teammate player characters based on the special tactics data associated with the reference situation. Here, the "predetermined result" is a comparison result that indicates that the current situation of the game is identical or similar to the reference situation.

In this embodiment, in a case where the degree of similarity between the current situation of the game and the reference situation is higher than a predetermined reference degree of similarity, the special behavior control section 82 starts the behavior control of the teammate player characters based on the special tactics data associated with the reference situation. Detailed description of operation of the special behavior control section 82 is given later (see S202 to S206 of FIG. 13).

Next, description is given of processing to be executed by the game device 10 to implement the game control section 66. FIGS. 11 to 14 are flow charts each illustrating an example of the processing to be executed by the game device 10.

Figure 11:
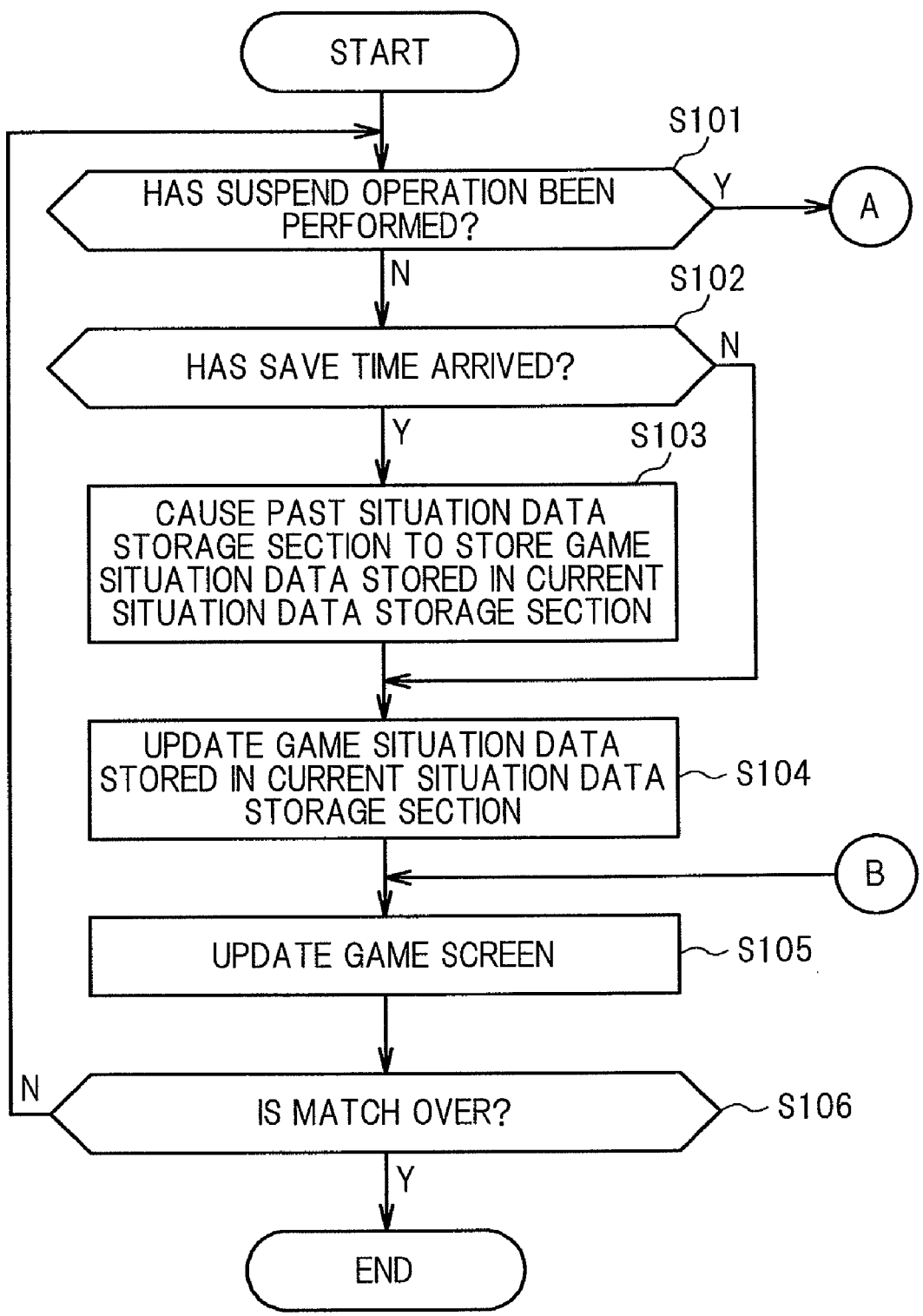
FIG. 11 is a flow chart illustrating an example of processing to be executed by the game device.
Figure 12:
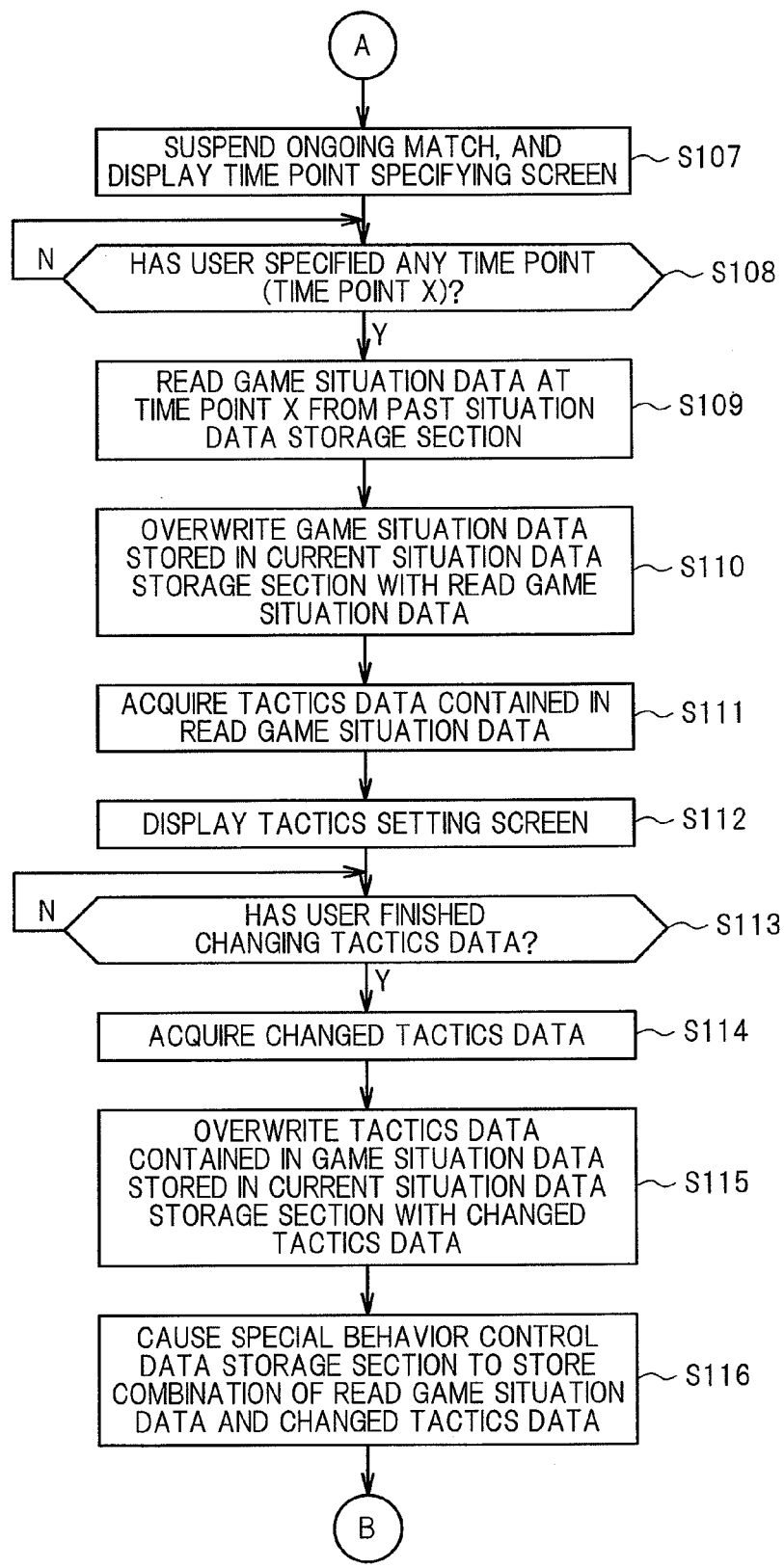
FIG. 12 is a flow chart illustrating an example of processing to be executed by the game device.

First, description is given of processing to be executed in the practice mode. FIGS. 11 and 12 illustrate the processing to be executed in the practice mode. As illustrated in FIG. 11, the control unit 14 judges whether or not the suspend operation has been performed by the user based on an operation signal input from the controller 30 (S101).

If it is judged that the suspend operation has not been performed, the control unit 14 (past situation data saving section 72) judges whether or not a save time has arrived (S102). The "save time" means a time at which the game situation data is to be saved into the past situation data storage section 62. For example, the save time comes at predetermined time intervals (for example, one second).

If it is judged that the save time has arrived, the control unit 14 (past situation data saving section 72) causes the past situation data storage section 62 to additionally store the game situation data stored in the current situation data storage section 60 (S103). Here, in a case where a predetermined number of pieces (for example, 30 pieces) of game situation data have already been stored in the past situation data storage section 62, the oldest piece of the game situation data is deleted from the past situation data storage section 62, and then the game situation data, which is stored in the current situation data storage section 60, is stored in the past situation data storage section 62.

In a case where the processing of Step S103 has been executed, or in a case where it is judged in Step S102 that the save time has not arrived, the control unit 14 (current situation data updating section 68) updates the game situation data stored in the current situation data storage section 60 (S104). In the processing of Step S104, the situation data of the game space 40 (location state data), the setting state data of the virtual camera 54, the score data, and the elapsed time data are updated.

For example, in the processing of Step S104, the location state (for example, position, orientation, etc.) of the player character 50 set as the operation subject of the user is updated based on the operation of the user.

Further, for example, the location states (for example, positions, orientations, etc.) of the teammate player characters are updated based on the behavior decision algorithm and the tactics data contained in the game situation data (see FIG. 8) stored in the current situation data storage section 60.

Further, for example, the location state (for example, position, etc.) of the ball 52 is updated.

On the other hand, if it is judged in Step S101 that the suspend operation has been performed, as illustrated in FIG. 12, the control unit 14 (reexecution section 74) temporarily suspends the ongoing match, and then displays the time point specifying screen (see FIG. 5) on the display unit 32 (S107). After that, the control unit 14 (reexecution section 74) monitors whether or not the user has specified, as the time point X, any time point within a period ranging from a predetermined period of time (for example, thirty seconds) before to the current time point on the time point specifying screen (S108).

In a case where the user has specified the time point X on the time point specifying screen, the control unit 14 (reexecution section 74, special behavior control data generating section 76) reads the game situation data at the time point X from the past situation data storage section 62 (S109). Here, in this case, pieces of the game situation data of the subsequent time points after the time point X are deleted from the past situation data storage section 62.

After that, the control unit 14 (reexecution section 74) overwrites the game situation data stored in the current situation data storage section 60 with the game situation data read in Step S109 (S110). As a result of executing the processing of Step S110, the current situation of the game is returned to the situation at the time point X, and the game is resumed from the situation at the time point X.

After that, the control unit 14 (special behavior control data generating section 76) acquires the tactics data contained in the game situation data (see FIG. 8) read in Step S109 (S111).

This tactics data is the tactics data used at the time point X, and corresponds to the "first tactics data".

After that, the control unit 14 (special behavior control data generating section 76) displays the tactics setting screen (see FIG. 6) on the display unit 32 (S112). In this case, the contents of the tactics data (formation, tactics, "offensive consciousness" parameter, "pressing" parameter, and "defensive line" parameter) acquired in Step S111 are displayed on the tactics setting screen. Then, the control unit 14 (special behavior control data generating section 76) monitors whether or not the user has finished changing the tactics data (S113).

In a case where the user has finished changing the tactics data, the control unit 14 (special behavior control data generating section 76) acquires the changed tactics data (S114). Specifically, the control unit 14 acquires tactics data that have been obtained by changing the tactics data acquired in Step S111 according to the contents changed by the user on the tactics setting screen. In this embodiment, the tactics data acquired in Step S114 corresponds to the "second tactics data".

After the changed tactics data is acquired, the control unit 14 overwrites the tactics data contained in the game situation data (see FIG. 8), stored in the current situation data storage section 60, with the tactics data acquired in Step S114 (S115). As a result of executing the processing of Step S115, in Step S104, the location states (for example, positions, orientations, etc.) of the teammate player characters are updated based on the tactics data (changed tactics data) acquired in Step S114.

Further, the control unit 14 (special behavior control data generating section 76) causes the special behavior control data storage section 64 to store the combination of the game situation data read in Step S109 and the tactics data (changed tactics data) acquired in Step S114 (S116). In this case, the game situation data read in Step S109 is stored as the reference situation data, and the tactics data (changed tactics data) acquired in Step S114 is stored as the special tactics data. It should be noted that if the same game situation data has already been stored in the special behavior control data storage section 64 as the reference situation data, the combination of the reference situation data and the tactics data associated with the reference situation data is overwritten.

After the processing of Step S104 or S116 is executed, as illustrated in FIG. 11, the control unit 14 (display control section 70) updates the game screen (S105). In the processing of Step S105, a game screen showing the situation of the game space 40, which is viewed from the virtual camera 54, is generated in the VRAM based on the game situation data stored in the current situation data storage section 60. Then, the game screen generated in the VRAM is displayed on the display unit 32.

After that, the control unit 14 (game control section 66) judges whether or not the match is over (S106). If the match is not over, the processing of Step S101 is reexecuted. It should be noted that unless the suspend operation is executed or the match is over, the processing of Steps S101 to S106 is repeatedly executed at predetermined time intervals (for example, $1/60^{th}$ of a second). On the other hand, if the match is over, this processing is ended. It should be noted that if the match is over, a screen showing the result of the match is displayed on the display unit 32, but description thereof is omitted in FIG. 11.

Figure 13:
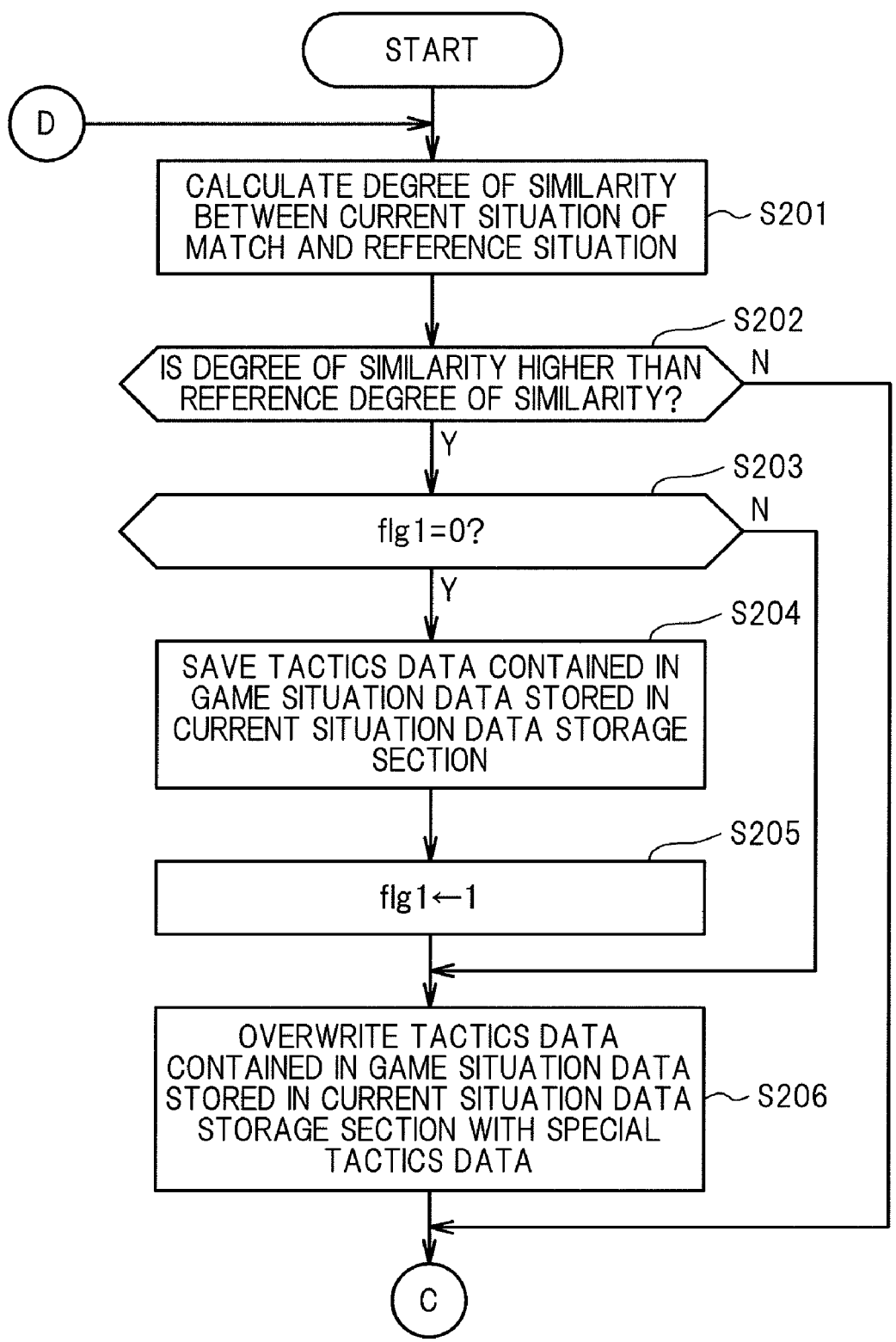
FIG. 13 is a flow chart illustrating an example of processing to be executed by the game device.
Figure 14:
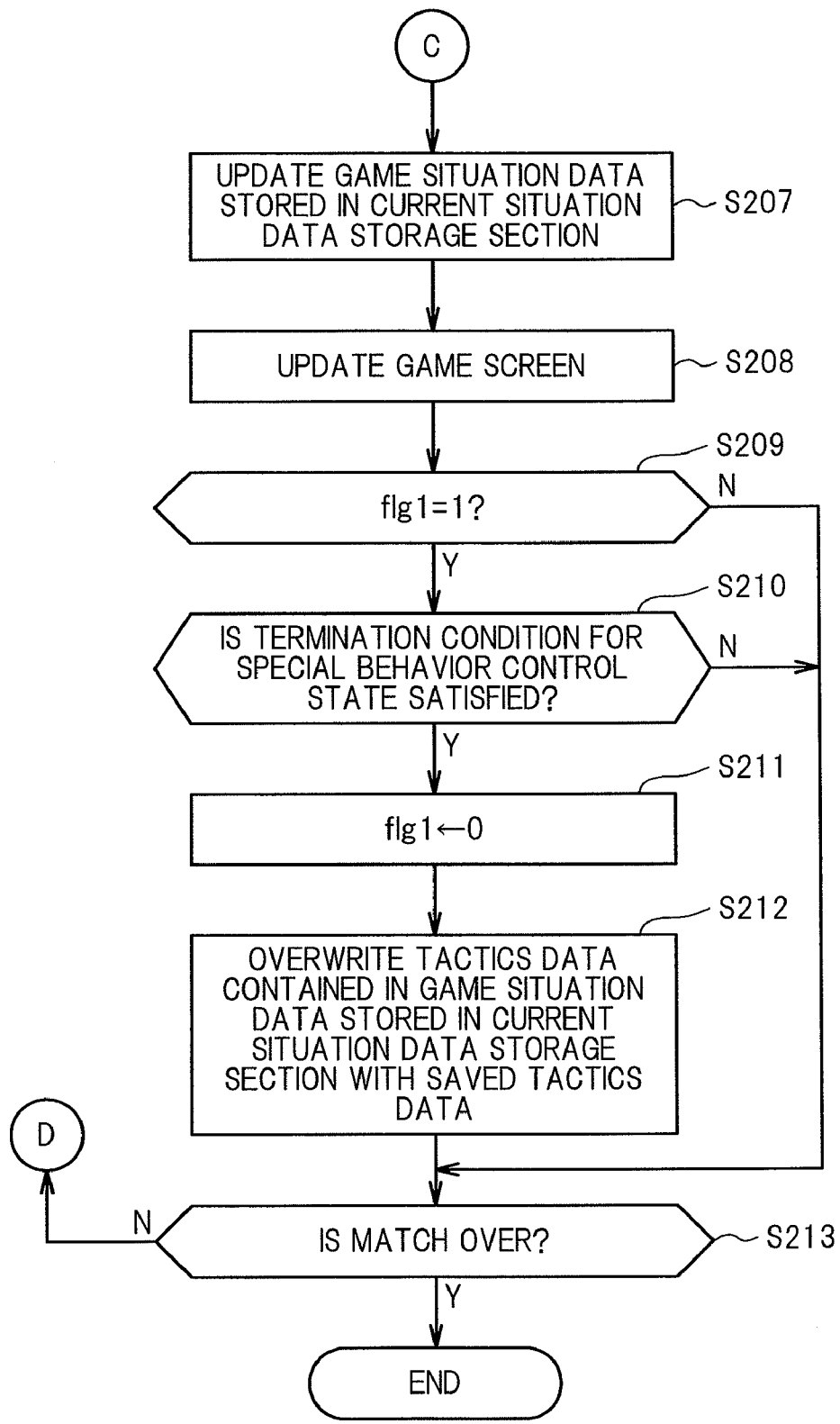
FIG. 14 is a flow chart illustrating an example of processing to be executed by the game device.

Next, description is given of processing to be executed in the normal mode. FIGS. 13 and 14 illustrate the processing to be executed in the normal mode. As illustrated in FIG. 13, the control unit 14 (comparison result acquiring section 80) calculates the degree of similarity between the current situation of the match and the reference situation based on the game situation data stored in the current situation data storage section 60 and the reference situation data stored in the special behavior control data storage section 64 (S201). In the processing of Step S201, for example, the degree of similarity with regard to the location states of the player characters 50 and the ball 52 is calculated. For example, the degree of similarity is calculated by making comparison between the current situation and the reference situation with regard to the positions and orientations of the player characters 50 belonging to the user team, the positions and orientations of the player characters 50 belonging to the opponent team, and the position of the ball 52.

It should be noted that in a case where a plurality of pieces of the reference situation data are stored in the special behavior control data storage section 64, the degree of similarity is calculated for each piece of the reference situation data. Then, processing from Steps S202 to S206 is executed with a focus only on a piece of the reference situation data that has the highest degree of similarity, and the other pieces of the reference situation data are ignored.

After the degree of similarity is calculated, the control unit 14 (special behavior control section 82) judges whether or not the degree of similarity is higher than the predetermined reference degree of similarity (S202). If it is judged that the degree of similarity is higher than the reference degree of similarity, the control unit 14 judges whether or not the value of a flag (flg 1) is 0 (S203). The flag (flg 1) indicates whether or not the current state is a state in which the behaviors of the teammate player characters are controlled based on the special tactics data (hereinafter, referred to as "special behavior control state"). The flag (flg 1) takes a value of 0 or 1. The value "0" indicates that the current state is not the special behavior control state, whereas the value "1" indicates that the current state is the special behavior control state.

If the value of the flag (flg 1) is 0, the control unit 14 saves the tactics data contained in the game situation data (see FIG. 8) stored in the current situation data storage section 60 into another storage region of the main memory 16 (S204). The tactics data saved in the processing of Step S204 is used for processing of Step S212 described below. Further, the control unit 14 updates the value of the flag (flg 1) to 1 (S205).

In a case where the processing of Step S205 has been executed or in a case where it is judged in Step S203 that the value of the flag (flg 1) is not 0, the control unit 14 (special behavior control section 82) overwrites, with the special tactics data stored in association with the reference situation data, the tactics data contained in the game situation data (see FIG. 8) stored in the current situation data storage section 60 (S206). As a result of executing the processing of Step S206, in the subsequent processing of Step S207, the location states (for example, positions, orientations, etc.) of the teammate player characters are updated based on the special tactics data.

In a case where the processing of Step S206 has been executed or in a case where it is judged in Step S202 that the degree of similarity is not higher than the reference degree of similarity, as illustrated in FIG. 14, the control unit 14 (current situation data updating section 68, special behavior control section 82) updates the game situation data stored in the current situation data storage section 60 (S207). The processing of Step S207 is the same as the processing of Step S104 of FIG. 11. After that, the control unit 14 (display control section 70) updates the game screen (S208). The processing of Step S208 is the same as the processing of Step S105 of FIG. 11.

After that, the control unit 14 judges whether or not the value of the flag (flg 1) is 1 (S209). If the value of the flag (flg 1) is 1, that is, if the current state is the special behavior control state, the control unit 14 judges whether or not a termination condition for the special behavior control state is satisfied (S210).

In the processing of Step S210, for example, in a case where the elapsed time after start of the special behavior control state, that is, the elapsed time after update of the flag (flg 1) to 1, has reached a reference time period, it is judged that the termination condition is satisfied.

Further, for example, in a case where the current state has become an out-of-play state, it is judged that the termination condition is satisfied. It should be noted that the out-of-play state is caused by, for example, a case in which the ball 52 has crossed over the goal line 44 or the touchline 46, or a case in which a foul has been committed.

If it is judged that the termination condition for the special behavior control state is satisfied, the control unit 14 updates the value of the flag (flg 1) to 0 (S211). Further, the control unit 14 overwrites the tactics data contained in the game situation data (see FIG. 8), stored in the current situation data storage section 60, with the tactics data saved in Step S204 (S212). It should be noted that the tactics data saved in Step S204 is the tactics data obtained before the tactics data contained in the game situation data stored in the current situation data storage section 60 is overwritten with the special tactics data. Specifically, the tactics data saved in Step S204 is the tactics data obtained before the special behavior control state is started. As a result of executing the processing of Step S212, the contents of the tactics data is reset to the contents obtained before the special behavior control state is started.

After the processing of Steps S209 to S212 is executed, the control unit 14 (game control section 66) judges whether or not the match is over (S213). If the match is not over, the processing of Step S201 is reexecuted. It should be noted that unless the match is over, the processing of Steps S201 to S213 is repeatedly executed at predetermined time intervals (for example, $\frac{1}{60}^{th}$ of a second). On the other hand, if the match is over this processing is ended. It should be noted that when the match is over, a screen showing the result of the match is displayed on the display unit 32, but description thereof is omitted in FIG. 14.

With the game device 10 according to the first embodiment described above, while repeatedly practicing playing the game from the situation at the time point in the past, the user can appropriately adjust the tactics data according to that situation. In addition, with the game device 10 according to the first embodiment, the user can utilize the result of the adjustment in the subsequent playing of the game. With the game device 10 according to the first embodiment, it becomes possible to realize the function of assisting the adjustment of the tactics data.

Second Embodiment

In the first embodiment described above, in the practice mode, by changing the tactics data used at the time point X on the tactics setting screen (see FIG. 6), the tactics data is adjusted. In this respect, a second embodiment is characterized in that the tactics data is adjusted by the user actually operating any one of the player characters 50 in the game resumed from the situation at the time point X. Hereinafter, description is given of the second embodiment. It should be noted that a game device 10 according to the second embodiment also has the hardware configuration illustrated in FIG. 1.

Description is given of a flow of a practice mode according to the second embodiment. In the practice mode according to the second embodiment, if the user has finished specifying the time point X on the time point specifying screen (see FIG. 5), a player selection screen for selecting a desired player character 50 is displayed instead of the tactics setting screen (see FIG. 6). FIG. 15 illustrates an example of the player selection screen. On the player selection screen illustrated in FIG. 15, the user operates the controller 30 to select any one of the player characters 50. It should be noted that on the player selection screen, only the player characters 50 that were playing in the match at the time point X may be selected from among the player characters 50 belonging to the user team.

In a case where the user has finished selecting a player character 50 on the player selection screen, the game (match) is resumed from the situation at the time point X. On this occasion, the user operates the player character 50 selected on the player selection screen. Then, in the second embodiment, the operation contents with regard to this player character 50 (or behavior contents of this player character 50) are recorded, and then the tactics data is generated based on the recording results. Therefore, by operating the player character 50 according to the situation at the time point X, the user can generate the tactics data appropriate to the situation at the time point X.

FIG. 16 is a schematic diagram illustrating an example of the tactics data to be generated according to the second embodiment. The tactics data illustrated in FIG. 16 contains data described below. The tactics data illustrated in FIG. 16 is different from the tactics data illustrated in FIG. 4 in that recording result data is contained.

(a) formation;
(b) tactics;
(c) "offensive consciousness" parameter;
(d) "pressing" parameter;
(e) "defensive line" parameter; and
(f) recording result data.

The recording result data contains data such as below:
(f-1) player identification data; and
(f-2) operation data or behavior data.

The player identification data is data for identifying the player character 50 selected by the user on the player selection screen (see FIG. 15). Specifically, the player identification data is data for identifying the player character 50 operated by the user in the game resumed from the situation at the time point X. Further, the operation data is data indicating an operation that the user has performed with respect to the player character 50 in the game resumed from the situation at the time point X. Further, the behavior data is data indicating a behavior that the player character 50 has performed according to the operation of the user in the game resumed from the situation at the time point X.

Similarly to the first embodiment, the generated tactics data is saved along with the situation of the match at the time point X. Specifically, the combination of the situation of the match at the time point X and the newly-generated tactics data is saved as the combination of the reference situation and the special tactics data.

Then, in the normal mode, which is subsequently to be executed, if the situation of the match has become a situation identical or similar to the reference situation, the behaviors of the teammate player characters are controlled based on the special tactics data associated with the reference situation.

Here, description is given of functions implemented in the game device 10 according to the second embodiment. The game device 10 according to the second embodiment also includes the functional blocks illustrated in FIG. 7. However, according to the second embodiment, the operation of the reexecution section 74 and the special behavior control data generating section 76 has a unique feature, and hence description is given of the operation of those functional blocks.

In the game resumed from the situation at the time point X, the reexecution section 74 sets any one of the plurality of player characters 50 belonging to the user team as the operation subject of the user. Further, the reexecution section 74 causes the player character 50 set as the operation subject of the user to behave according to the operation of the user.

Further, in the game resumed from the situation at the time point X, the special behavior control data generating section 76 acquires the content of the operation that the user has performed with respect to the player character 50 set as the operation subject of the user. Alternatively, in the game resumed from the situation at the time point X, the special behavior control data generating section 76 acquires the content of the behavior that the player character 50, set as the operation subject of the user, has performed according to the operation of the user. Then, the special behavior control data generating section 76 generates new tactics data (second tactics data) based on the tactics data (first tactics data) used at the time point X and at least one of the operation content and the behavior content.

This new tactics data is stored in the special behavior control data storage section 64 along with the situation of the game at the time point X. Specifically, the situation of the game at the time point X is stored, as the reference situation, in the special behavior control data storage section 64, and the new tactics data is stored, as the special tactics data corresponding to the reference situation, in the special behavior control data storage section 64.

Next, description is given of processing to be executed by the game device 10 according to the second embodiment.

Figure 17:
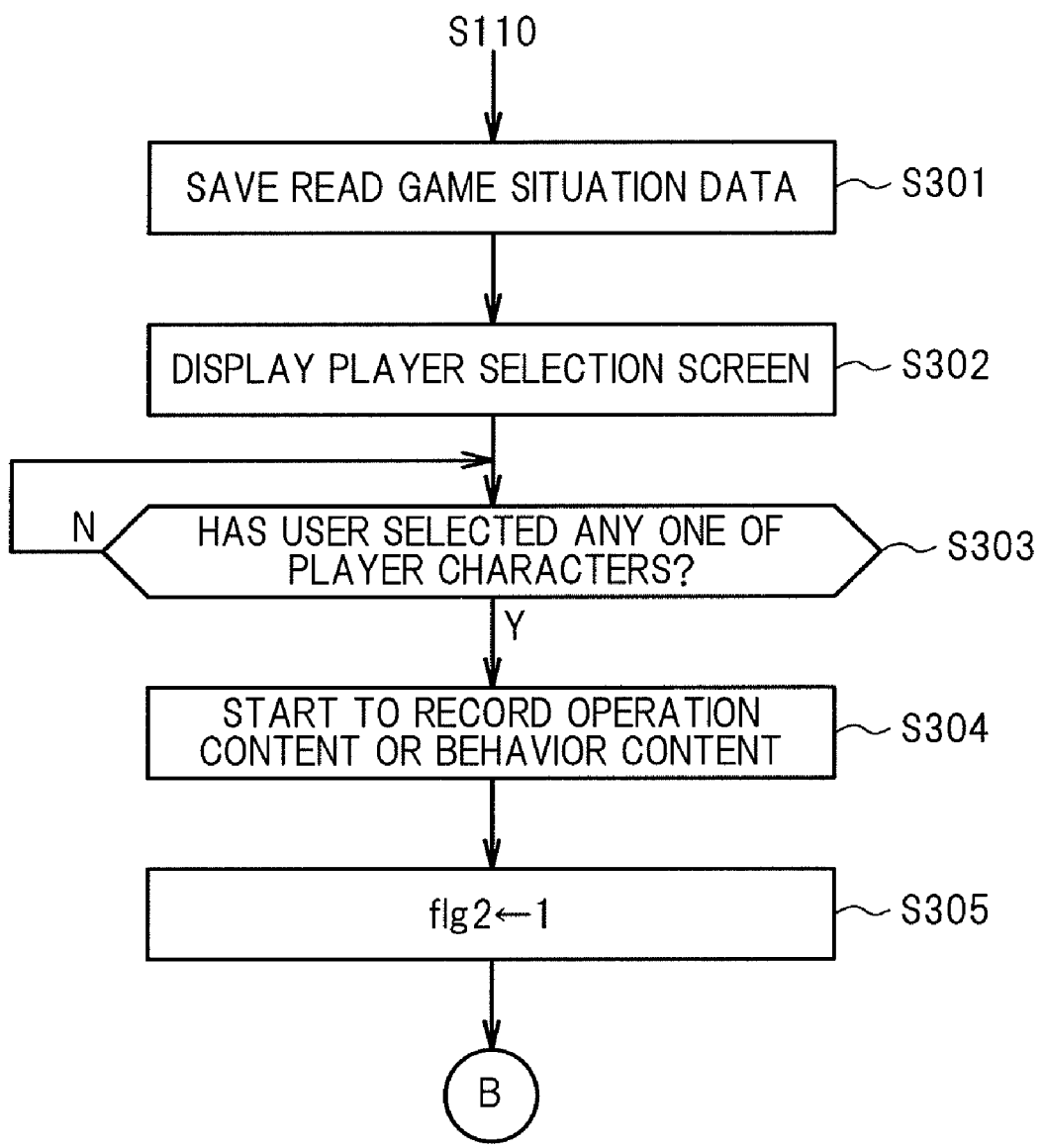
FIG. 17 is a flow chart illustrating an example of processing to be executed by the game device.

First, description is given of processing to be executed in the practice mode. In the practice mode according to the second embodiment, after the processing of Step S110 of FIG. 12 is executed, processing from Steps S301 to S305 illustrated in FIG. 17 is executed instead of the processing of Steps S111 to S116.

Specifically, after the processing of Step S110 of FIG. 12 is executed, the control unit 14 saves the game situation data read in Step S109 into another storage region of the main memory 16 (S301). The game situation data saved in the processing of Step S301 is used for processing of Steps S404 and S405 of FIG. 18 described below.

After that, the control unit 14 (reexecution section 74) displays the player selection screen (see FIG. 15) on the display unit 32 (S302). Then, the control unit 14 (reexecution section 74) monitors whether or not the user has selected any one of the player characters 50 belonging to the user team (S303).

In a case where the user has selected any one of the player characters 50, the match is resumed from the situation at the time point X. In this case, the player character 50 selected by the user is set as the operation subject. Here, in such a case, the operation content or the behavior content of the player character 50 selected by the user needs to be recorded, and hence, for example, unless the user performs a switching operation, the operation subject of the user may not be switched.

In a case where the match is resumed from the situation at the time point X, the control unit 14 (special behavior control data generating section 76) starts to record the operation content or the behavior content with regard to the player character 50 set as the operation subject of the user (S304). Further, the control unit 14 updates the value of a flag (flg 2) to 1 (S305). The flag (flg 2) indicates whether or not the current state is a state in which recording of the operation content or the behavior content is being executed. The flag (flg 2) takes a value of 0 or 1. The value "0" indicates that the recording is not being executed, whereas the value "1" indicates that the recording is being executed.

Figure 18:
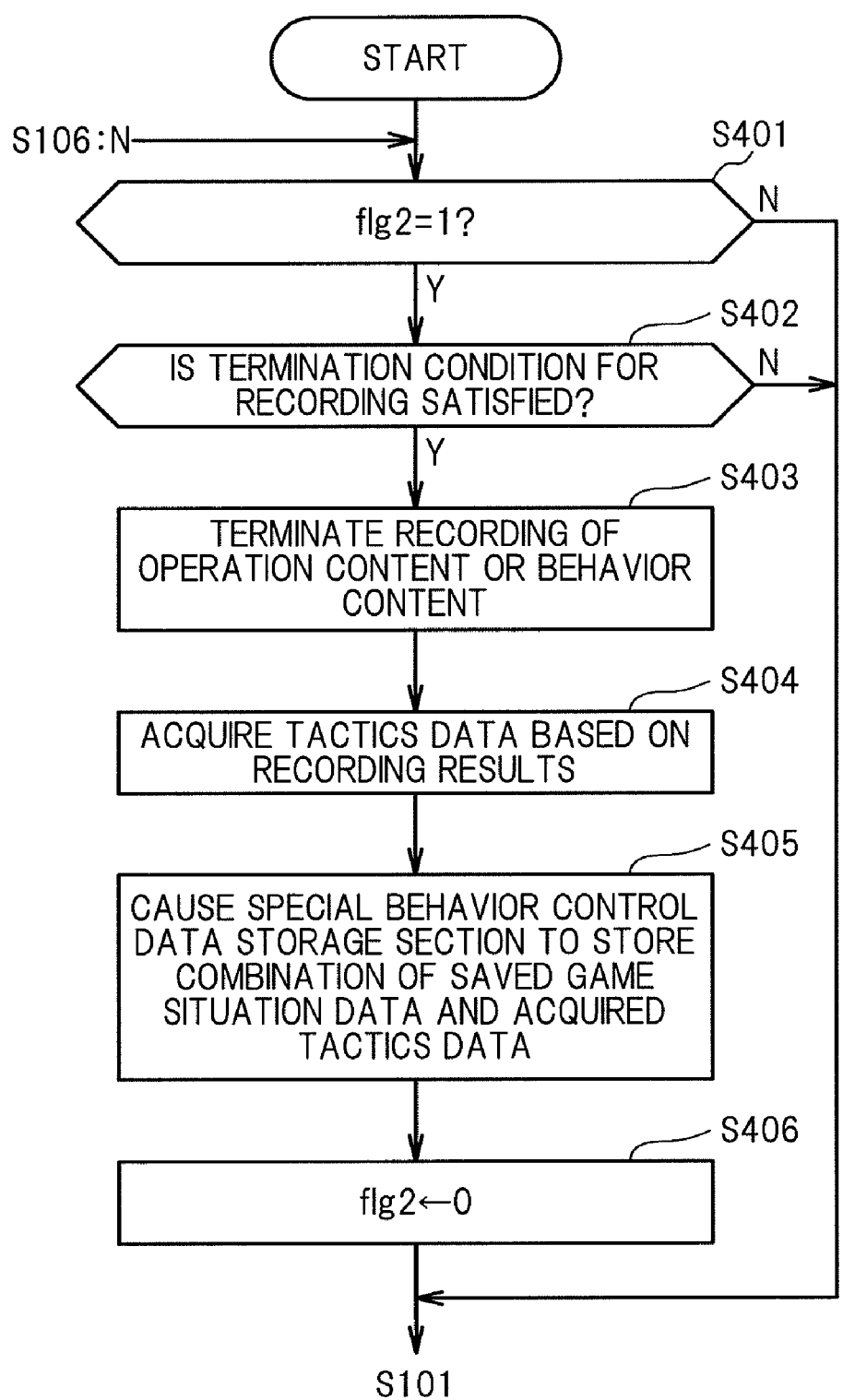
FIG. 18 is a flow chart illustrating an example of processing to be executed by the game device.

Further, in the practice mode according to the second embodiment, before the processing of Step S101 of FIG. 11 is executed, processing of Steps S401 to S406 illustrated in FIG. 18 is executed.

Specifically, before the processing of Step S101 of FIG. 11 is executed, the control unit 14 judges whether or not the value of the flag (flg 2) is 1 (S401). If the value of the flag (flg 2) is 1, that is, if the recording of the operation content or the behavior content is being executed, the control unit 14 judges whether or not a termination condition for the recording is satisfied (S402).

In the processing of Step S402, for example, in a case where the current state has become an out-of-play state, it is judged that the termination condition is satisfied. Further, for example, in a case where the elapsed time after resumption of the match has reached a reference time period, it is judged that the termination condition is satisfied. Further, for example, in a case where the operation subject of the user has been switched to another player character 50, it is judged that the termination condition is satisfied. Further, for example, in a case where the suspend operation has been performed, it is also judged that the termination condition is satisfied.

If it is judged that the termination condition is not satisfied, the control unit 14 (special behavior control data generating section 76) continues the recording of the operation content or the behavior content. On the other hand, if it is judged that the termination condition is satisfied, the control unit 14 terminates the recording of the operation content or the behavior content (S403). Then, the control unit 14 (special behavior control data generating section 76) acquires the tactics data based on the recording results of the operation content or the behavior content (S404). In the processing of Step S404, for example, tactics data such as illustrated in FIG. 16 is generated.

Specifically, player identification data for identifying the player character 50 operated by the user and operation data or behavior data, which indicates the recording results of the operation content or the behavior content, are acquired. Then, by combining those pieces of data and the tactics data contained in the game situation data (see FIG. 8) saved in Step S301, the tactics data illustrated in FIG. 16 is acquired.

It should be noted that the game situation data saved in Step S301 is the game situation data at the time point X (see S109 of FIG. 12). Hence, the following may be said: in the processing of Step S404, the tactics data is generated by combining the contents (formation, tactics, "offensive consciousness" parameter, "pressing" parameter, and "defensive line" parameter) of the tactics data at the time point X with the recording results of the content of the operation or behavior performed in the game resumed from the situation at the time point X.

After the processing of Step S404 is executed, the control unit 14 (special behavior control data saving section 78) causes the special behavior control data storage section 64 to store the combination of the game situation data saved in Step S301 and the tactics data acquired in Step S404 (S405). As described above, the game situation data saved in Step S301 is the game situation data at the time point X (see S109 of FIG. 12). Hence, in the processing of Step S405, the game situation data at the time point X is stored as the reference situation data, while the tactics data acquired in Step S404 is stored as the special tactics data. After the processing of Step S405 is executed, the control unit 14 updates the value of the flag (flg 2) to 0 (S406).

Next, description is given of processing in the normal mode. In a normal mode according to the second embodiment, similarly to the first embodiment, the processing of FIGS. 13 and 14 is executed.

Here, in the second embodiment, in a case where the tactics data contained in the game situation data stored in the current situation data storage section 60 is overwritten with the special tactics data, the location states of the teammate player characters are updated based on the tactics data (see FIG. 16) containing the recording result data (player identification data and operation data or behavior data) in the processing of Step S207 of FIG. 14. In this case, processing different from the processing of the first embodiment is executed.

Specifically, the control unit 14 (special behavior control section 82) controls the location state (for example, position, orientation, etc.) of the teammate player character identified by the player identification data contained in the tactics data (see FIG. 16), based on the operation data or behavior data contained in the tactics data. This teammate player character behaves according to the operation indicated by the operation data or behaves as indicated by the behavior data.

It should be noted that similarly to the first embodiment, the location states (for example, positions, orientations, etc.) of teammate player characters other than the teammate player character identified by the player identification data are controlled based on the setting contents of the formation, the tactics, the "offensive consciousness" parameter, the "pressing" parameter, and the "defensive line" parameter.

With the game device 10 according to the second embodiment described above, the user can appropriately adjust the tactics data according to the situation at the time point in the past by actually operating the player character 50. In addition, with the game device 10 according to the second embodiment, the user can utilize the result of the adjustment in the subsequent play of the game. With the game device 10 according to the second embodiment, it becomes possible to realize the function of assisting the adjustment of the tactics data.

Third Embodiment

A third embodiment is a combination of the first embodiment and the second embodiment. Specifically, the third embodiment is characterized in that, in the practice mode, by changing the tactics data used at the time point X on the tactics setting screen (see FIG. 6), the tactics data is adjusted, and that the tactics data is also adjusted by the user actually operating any one of the player characters 50 in the game resumed from the situation at the time point X. It should be noted that a game device 10 according to the third embodiment has the hardware configuration illustrated in FIG. 1 as well.

Description is given of a flow of a practice mode according to the third embodiment. In the practice mode according to the third embodiment, in a case where the user has finished specifying the time point X on the time point specifying screen (see FIG. 5), the tactics setting screen (see FIG. 6) is displayed. Further, in a case where the user has finished changing the tactics data on the tactics setting screen, the player selection screen (see FIG. 15) is displayed. Then, in a case where the user has finished selecting a player character 50 on the player selection screen, the game (match) is resumed from the situation at the time point X.

On this occasion, similarly to the second embodiment, the user operates the player character 50 selected on the player selection screen. Further, the operation content with regard to this player character 50 (or behavior content of the player character 50) is recorded.

Then, in the third embodiment, based on both the contents changed on the tactics setting screen and the recording results of the operation content or the behavior content, new tactics data is generated. This new tactics data is saved along with the situation of the match at the time point X. Specifically, the combination of the situation of the match at the time point X and the newly-generated tactics data is saved as the combination of the reference situation and the special tactics data.

Then, in the normal mode, which is subsequently to be executed, in a case where the situation of the match has become a situation identical or similar to the reference situation, the behaviors of the teammate player characters are controlled based on the special tactics data associated with the reference situation.

Here, description is given of functions implemented in the game device 10 according to the third embodiment. The game device 10 according to the third embodiment includes the functional blocks illustrated in FIG. 7 as well. However, according to the third embodiment, the operation of the reexecution section 74 and the special behavior control data generating section 76 has a unique feature, and hence description is given of the operation of those functional blocks.

The special behavior control data generating section 76 acquires third tactics data (third behavior control data) obtained by changing the first tactics data, which is the tactics data used at the time point X, based on the operation performed by the user on the tactics setting screen (see FIG. 6).

In the game reexecuted from the situation at the time point X, the reexecution section 74 sets anyone of the plurality of player characters 50 belonging to the user team as the operation subject of the user. Further, the reexecution section 74 causes the player character 50 set as the operation subject of the user to behave according to the operation of the user. Further, the reexecution section 74 causes the player characters 50, which are not set as the operation subject of the user among the plurality of player characters 50 belonging to the user team, to behave based on the third tactics data (tactics data obtained after being changed on the tactics setting screen).

Further, the special behavior control data generating section 76 generates new tactics data (second tactics data) based on the third tactics data and at least one of the content of the operation that the user has performed with respect to the player character 50 set as the operation subject of the user and the content of the behavior that the player character 50 set as the operation subject of the user has performed according to the operation of the user.

This new tactics data is stored in the special behavior control data storage section 64 along with the situation of the game at the time point X. Specifically, the situation of the game at the time point X is stored, as the reference situation, in the special behavior control data storage section 64, and the new tactics data is stored, as the special tactics data corresponding to the reference situation, in the special behavior control data storage section 64.

Then, description is given of processing to be executed by the game device 10 according to the third embodiment.

First, description is given of processing to be executed in the practice mode. In the practice mode according to the third embodiment, in order to display both the tactics setting screen (see FIG. 6) of the first embodiment and the player selection screen (see FIG. 15) of the second embodiment, the following processing is executed. That is, after the processing of Step S115 illustrated in FIG. 12 is executed, the processing of Steps S301 to S305 illustrated in FIG. 17 is executed instead of the processing of Step S116.

Further, also in the practice mode according to the third embodiment, similarly to the second embodiment, before the processing of Step S101 illustrated in FIG. 11 is executed, the processing of Steps S401 to S406 illustrated in FIG. 18 is executed. However, in Step S404, processing different from the processing of the second embodiment is executed.

In the processing of Step S404, first, the player identification data for identifying the player character 50 operated by the user is acquired. Further, the operation data or behavior data indicating the recording results of the operation content or behavior content is also acquired. Then, based on those pieces of data and the tactics data contained in the game situation data (see FIG. 8) stored in the current situation data storage section 60, the new tactics data is acquired.

It should be noted that the tactics data contained in the game situation data (see FIG. 8) stored in the current situation data storage section 60 is the tactics data obtained after being changed on the tactics setting screen (see FIG. 6) (see S115 of FIG. 12). Hence, in the processing of Step S404, the tactics data is generated by combining the contents (formation, tactics, "offensive consciousness" parameter, "pressing" parameter, and "defensive line" parameter) of the tactics data obtained after being changed on the tactics setting screen with the recording results of the content of the operation or behavior performed in the game resumed from the situation at the time point X.

Next, description is given of processing to be executed in the normal mode. Also, in a normal mode according to the third embodiment, similarly to the first embodiment and the second embodiment, the processing of FIGS. 13 and 14 is executed.

Here, in a case where the tactics data contained in the game situation data stored in the current situation data storage section 60 is overwritten with the special tactics data, the location states of the teammate player characters are updated based on the tactics data (see FIG. 16) containing the recording result data (player identification data and operation data or behavior data) in the processing of Step S207 of FIG. 14.

In this case, the control unit 14 (special behavior control section 82) controls the location state (for example, position, orientation, etc.) of the teammate player character identified by the player identification data contained in the tactics data, based on the operation data or behavior data contained in the tactics data. As a result, this teammate player character behaves according to the operation indicated by the operation data or behaves as indicated by the behavior data.

It should be noted that the location states (for example, positions, orientations, etc.) of teammate player characters other than the teammate player character identified by the player identification data are controlled based on the setting contents of the formation, the tactics, the "offensive consciousness" parameter, the "pressing" parameter, and the "defensive line" parameter.

With the game device 10 according to the third embodiment described above, while repeatedly practicing playing the game from the situation at the time point in the past, the user can appropriately adjust the tactics data according to that situation. Further, with the game device 10 according to the third embodiment, the user can also appropriately adjust the tactics data according to the situation at the time point in the past by actually operating the player character 50. In addition, with the game device 10 according to the third embodiment, the user can utilize the result of the adjustment in the subsequent play of the game. With the game device 10 according to the third embodiment, it becomes possible to realize the function of assisting the adjustment of the tactics data.

It should be noted that the present invention is not limited to the first to third embodiments described above.

(1) For example, an image indicating that the behaviors of the teammate player characters are controlled based on the special tactics data may be displayed on the game screen.

(2) Further, for example, a plurality of types of behavior decision algorithms may be prepared so that the user can select one or more desired behavior decision algorithms. Then, the selection result of the user may be used as a part of the tactics data.

(3) Further, for example, the functions (retry function and function of adjusting the tactics data) provided in the practice mode may be provided in the normal mode. Further, in this case, the practice mode may be omitted.

(4) Further, for example, the present invention is also applicable to sports games other than the soccer game. For example, the present invention is also applicable to a basketball game, an American football game, a baseball game, or a tennis game, which are played using a ball (moving object), or an ice hockey game that is played using a puck (moving object). It should be noted that a plurality of dynamic objects corresponding to a plurality of players and a dynamic object corresponding to a moving object (ball or puck) are located in a game space of this case. Further, for example, the present invention is applicable to a racing game in which a plurality of automobiles compete in a race. It should be noted that a plurality of dynamic objects corresponding to the plurality of automobiles are located in a game space of this case.

Further, the present invention is also applicable to games other than the sports game. For example, the present invention is applicable to a game in which a plurality of game characters fight against each other. It should be noted that a plurality of dynamic objects corresponding to the plurality of game characters are located in a game space of this case.

Further, the present invention is also applicable to a network game executed via a communication network.

(5) Further, for example, the game space may be a virtual two-dimensional space. Specifically, the position etc. of a dynamic object located in the game space may be managed by two coordinate elements.

(6) While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game configured such that one or more game characters behave based on behavior control data, the game device comprising, on the basis of a computer, a program and data:

a reexecution section for returning a situation of the game to a situation at a time point in the past, and reexecuting the game from the situation at the time point in the past;

a generation section for generating second behavior control data based on first behavior control data and an operation of a user, the first behavior control data being the behavior control data used at the time point in the past;

a save section for storing the situation at the time point in the past as a reference situation in a storage, and storing, in the storage, the second behavior control data as special behavior control data associated with the reference situation;

a comparison result acquiring section automatically operative for acquiring, in the game to be executed after the reference situation and the special behavior control data are stored in the storage, a comparison result between a current situation of the game and the reference situation; and a behavior control section automatically operative for starting, in a case where the comparison result is a predetermined result, behavior control of the one or more game characters based on the special behavior control data stored in association with the reference situation.

2. A game device according to claim 1, wherein:
the generation section comprises a section for displaying, on a display unit, a screen for prompting the user to change the first behavior control data; and
the generation section generates the second behavior control data by changing the first behavior control data based on the operation performed by the user on the screen.

3. A game device according to claim 2, wherein:
the generation section acquires, as the second behavior control data, the behavior control data obtained by changing the first behavior control data based on the operation performed by the user on the screen; and
the reexecution section comprises a section for causing the one or more game characters to behave based on the second behavior control data in the reexecuted game.

4. A game device according to claim 2, wherein:
the game is a game configured such that a plurality of game characters behave based on the behavior control data;
the generation section comprises a section for acquiring third behavior control data obtained by changing the first behavior control data based on the operation performed by the user on the screen;
the reexecution section comprises:
  a section for setting one of the plurality of game characters as an operation subject of the user in the reexecuted game;
  a section for causing the one of the plurality of game characters, which is set as the operation subject of the user, to behave according to an operation of the user in the reexecuted game; and
  a section for causing one or more game characters that are not set as the operation subject of the user among the plurality of game characters to behave based on the third behavior control data in the reexecuted game; and
the generation section generates the second behavior control data based on the third behavior control data and at least one of a content of the operation that the user has performed with respect to the one of the plurality of game characters, which is set as the operation subject of the user, and a content of a behavior that the one of the plurality of game characters, which is set as the operation subject of the user, has performed according to the operation of the user.

5. A game device according to claim 1, wherein:
the game is a game configured such that a plurality of game characters behave based on the behavior control data;
the reexecution section comprises:
  a section for setting one of the plurality of game characters as an operation subject of the user in the reexecuted game; and
  a section for causing the one of the plurality of game characters, which is set as the operation subject of the user, to behave according to an operation of the user in the reexecuted game; and the generation section generates the second behavior control data based on the first behavior control data and at least one of a content of the operation that the user has performed with respect to the one of the plurality of game characters, which is set as the operation subject of the user, and a content of a behavior that the one of the plurality of game characters, which is set as the operation subject of the user, has performed according to the operation of the user.

6. A method of controlling a game device, having a computer, program and data, for executing a game configured such that one or more game characters behave based on behavior control data,
the method comprising:
a reexecution step of returning a situation of the game to a situation at a time point in the past, and reexecuting the game from the situation at the time point in the past;
a generation step of generating second behavior control data based on first behavior control data and an operation of a user, the first behavior control data being the behavior control data used at the time point in the past;
a save step of storing the situation at the time point in the past as a reference situation in a storage, and storing, in the storage, the second behavior control data as special behavior control data associated with the reference situation;
a comparison result acquiring step of automatically acquiring, in the game to be executed after the reference situation and the special behavior control data are stored in the storage, a comparison result between a current situation of the game and the reference situation; and
a behavior control step of automatically starting, in a case where the comparison result is a predetermined result, behavior control of the one or more game characters based on the special behavior control data stored in association with the reference situation.

7. A non-transitory computer-readable information storage medium storing a program, the program causing a computer to function as a game device for executing a game configured such that one or more game characters behave based on behavior control data,
the program further causing the computer to function as:
a reexecution section for returning a situation of the game to a situation at a time point in the past, and reexecuting the game from the situation at the time point in the past;
a generation section for generating second behavior control data based on first behavior control data and an operation of a user, the first behavior control data being the behavior control data used at the time point in the past;
a save section for storing the situation at the time point in the past as a reference situation in a storage, and storing, in the storage, the second behavior control data as special behavior control data associated with the reference situation;
a comparison result acquiring section for automatically acquiring, in the game to be executed after the reference situation and the special behavior control data are stored in the storage, a comparison result between a current situation of the game and the reference situation; and
a behavior control section for automatically starting, in a case where the comparison result between the situation of the game and the reference situation is a predetermined result, behavior control of the one or more game characters based on the special behavior control data stored in association with the reference situation.

* * * * *